(12) United States Patent
Ishibashi et al.

(10) Patent No.: US 7,973,744 B2
(45) Date of Patent: Jul. 5, 2011

(54) DISPLAY DEVICE

(75) Inventors: Masayoshi Ishibashi, Tokyo (JP); Midori Kato, Asaka (JP)

(73) Assignee: Hitachi, Ltd., Tokyo (JP)

( * ) Notice: Subject to any disclaimer, the term of this patent is extended or adjusted under 35 U.S.C. 154(b) by 875 days.

(21) Appl. No.: 12/000,137

(22) Filed: Dec. 10, 2007

(65) Prior Publication Data

US 2008/0144160 A1    Jun. 19, 2008

(30) Foreign Application Priority Data

Dec. 14, 2006  (JP) ................. 2006-336487

(51) Int. Cl.
  *G09G 3/30*  (2006.01)
  *G09G 5/00*  (2006.01)
(52) U.S. Cl. ........................ 345/76; 345/107
(58) Field of Classification Search ............. 345/76, 345/85, 107
See application file for complete search history.

(56) References Cited

U.S. PATENT DOCUMENTS

| | | | | |
|---|---|---|---|---|
| 5,862,275 | A | * | 1/1999 | Takeuchi et al. ............. 345/85 |
| 2006/0050028 | A1 | * | 3/2006 | Pasch et al. ............. 345/76 |
| 2006/0261709 | A1 | | 11/2006 | Kato et al. |
| 2007/0120444 | A1 | | 5/2007 | Kato et al. |

OTHER PUBLICATIONS

Midori Kato et al., "New Polymer-Actuators Using Carbon Nano-Particles Composite (II)", 23rd Annual Conference of the Robotics Society of Japan, 2005, pp. 1-2 and English translation pp. 1-8.

* cited by examiner

*Primary Examiner* — Kevin M Nguyen
(74) *Attorney, Agent, or Firm* — Stites & Harbison PLLC; Juan Carlos A. Marquez, Esq.

(57) ABSTRACT

A display device uses an organic actuator as a pixel, and an under-layer substrate is formed underneath the actuator. A surface of the actuator is set to a black and a surface of the substrate is set to a white. Seeing the actuator from an outside, the surface of actuator is visible in a black when the actuator is a planar state and visible in a white when the actuator is inflected, which realizes a display. In addition, the actuator has a memory effect by utilizing a shape memory effect and Coulomb force of the organic material.

12 Claims, 8 Drawing Sheets

FIG. 9A1
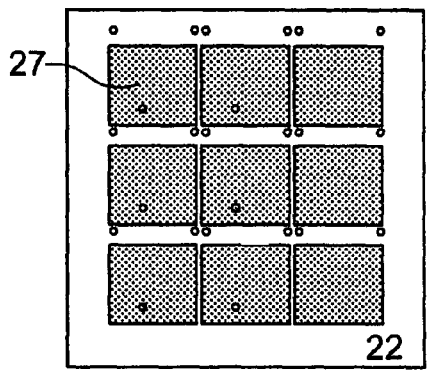
FIG. 9A2
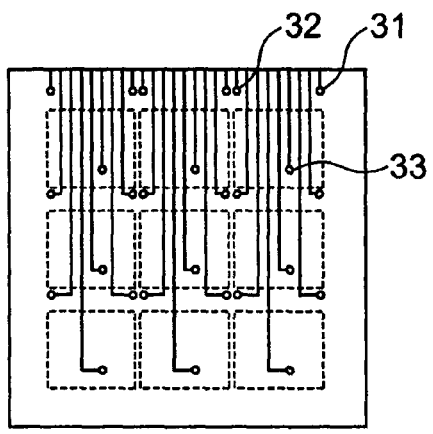
FIG. 9B
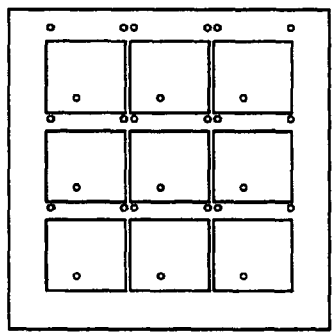
FIG. 9C
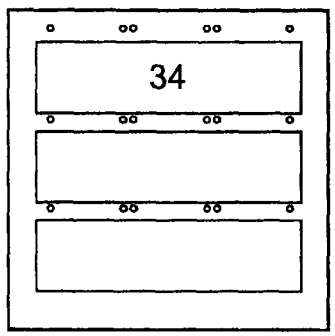
FIG. 9D
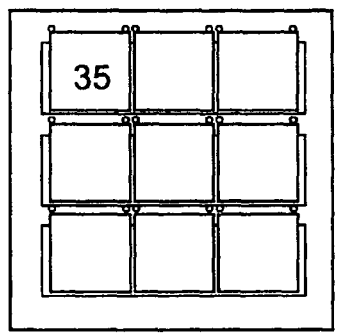
FIG. 9E
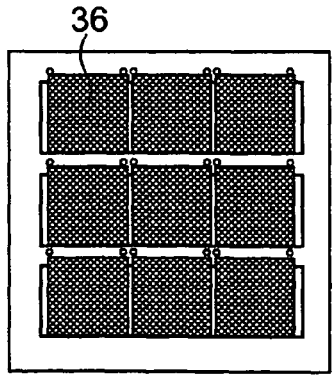
FIG. 9F
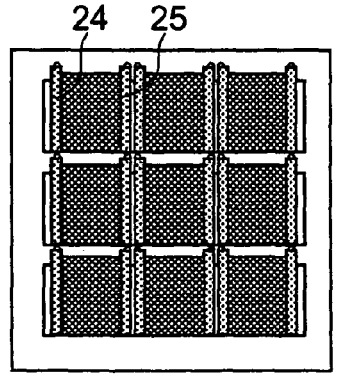
FIG. 9G
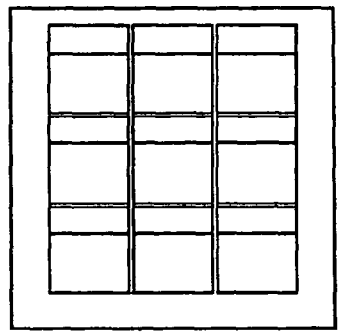

DISPLAY DEVICE

CLAIM OF PRIORITY

The present application claims priority from Japanese application JP 2006-336487 filed on Dec. 14, 2006, the contents of which is hereby incorporated by reference into this application.

BACKGROUND OF THE INVENTION

The present invention relates to a display device, and particularly to a thin and light-weight flexible sheet-like display device.

In these years, with the advance of a ubiquitous network, a high-performance personal data assistance has been desired so that an advanced communication is performed in a bidirectional transmission. Such personal data assistance has an image display device on which not only text information is displayed conventionally, but also photographic images and moving images are displayed clearly. The personal data assistance further requires the following requirements such that "it should be thin and light in weight to be carried easily" "it should have a flexibility not to be fragile even if it is subject to mechanical shock in carrying around" and "it should also be low power consumption because of operation by a battery." Further, the digital terrestrial broadcasting has been started to thereby put moving images on the image display device in vehicles such as a train, bus, automobile, etc. so that such demands are predicted to increase in the future. For this reason, it is desirable that the image display device has a thin type capable of installing on a little mounting space and also has a flexibility capable of installing on a curved surface alongside of a wall.

In the past, a liquid-crystal display has been used mainly as being corresponded to the thin-type image display device. However, the liquid-crystal display is heavy and no flexibility because the most of this type of the display uses a glass for a substrate. For this reason, the liquid-crystal display is fragile against a mechanical shock and difficult to install on the curved surface.

In order to overcome a drawback of the foregoing device, an electronic paper has been studied by utilizing an organic EL (electroluminescence), a cataphoresis of particles, etc., as a new thin-type image display device.

According to the foregoing study, there has been a paper, by Midori Kato and Masayoshi Ishibashi, "New Polymer-Actuators Using Carbon Nano-particle Composite (II)" 23rd Annual Conference of the Robotics Society of Japan, 2005, 1A32.

SUMMARY OF THE INVENTION

The electronic paper utilizing the organic EL, the cataphoresis of particles, etc. uses possibly a plastic substrate having a light weight and flexibility. Therefore, it can be made into a thin and light-weight and also given to a flexibility compared with an electronic paper using a conventional glass substrate. However, in addition to the foregoing characteristics, it is difficult to provide a high contrast together with a low power consumption so that an image is displayed clearly.

An object of the invention is to provide a display device having a low power consumption and high contrast, a thin and light-weight, and flexibility.

According to an aspect of the invention, a display device provides with a substrate having a surface of a planar state, a first electrode provided on the surface of the substrate and having a surface of a planar states, a first controller having a first power source to apply a voltage to the first electrode, and a self-heat generation type organic actuator, an end side of which is fixed on the substrate, and provided on the first electrode, wherein the actuator has a plate-like conductive organic material member on which a pair of second electrodes is provided to supply an electric power to the organic material member, and a second controller having a second power source to supply a voltage to the pair of second electrodes, and wherein (a) the actuator is assumed that a fixed portion at the end side of the actuator and other portion thereof are inflected about the end side, in an initial state, (b) a voltage is applied to the pair of second electrodes and a voltage applied to the first electrode is turned to a non-applied state so that the actuator is deformed from an inflected state to a planar state, (c) subsequently, the voltage applied to the pair of second electrodes is turned to the non-applied state and the first electrode is turned to a voltage applied-state so that the actuator maintains the planar state, (d) the voltage applied to the pair of second electrodes is then turned to the non-applied state and the first electrode is turned to the voltage non-applied state so that the actuator maintains continuously the planar state, (e) next, the voltage applied to the pair of second electrodes is turned to the applied-state and the first electrode is turned to the voltage non-applied state so that the actuator maintains continuously the planar state, (f) the voltage applied to the pair of second electrodes is turned to the non-applied state and the first electrode is turned to the voltage non-applied state so that the actuator is deformed from the planar state to the inflected state, and operations (b) to (f) are repeated so that the actuator can indicate two states of the planar state and inflected state.

The present invention uses an organic actuator as pixels on the display device.

The organic actuator is an actuator constituted of an organic material, the shape of which is deformed by an electric signal. The organic actuator has a light weight and flexibility because of using the organic material, particularly, the invention adopts a self-heat generation type organic actuator utilizing a thermal expansion disclosed in the foregoing document.

The self-heat generation type organic actuator utilizing the heat expansion is an actuator constituted of a conductive organic material having a high thermal expansion coefficient. An operational principle of the actuator utilizes a shape deformation of the material caused by a heat generated from Joule heat when a current flows into the actuator material. That is, flowing a current into the actuator makes it to increase in size, and stopping the current flowing in the actuator makes it to return to an original size. Substantially, the self-heat generation type organic actuator is of an expansion/contraction-type actuator. On the other hand, the self-heat generation type organic actuator can be turned easily into a unimorph-type inflection actuator if a low thermal expansion coefficient material is stacked to be made into a multilayer structure. That is, the actuator shape can be deformed arbitrarily from a planar state to an inflected surface state, and vice versa, by an electric signal, which makes an actuator having the foregoing property.

An operational principle of the pixel using the self-heat generation type organic actuator will be described below. First, an inflection-type organic actuator whose surface is a black is arranged on a white under-layered substrate. Seeing this structure from top, the actuator is a black when it is not inflected (actuator has the planar state), on the other hand, when the actuator is inflected, a part of the actuator is rolled up to be visible by a white of the substrate. That is, seeing the structure from top, a different color is visible in response to the shape of actuator. In this way, a pixel for a reflection-type display device is realized by changing the color due to the shape of actuator.

In the case of the unimorph-type inflection actuator using the self-heat generation type organic actuator, it is possible to inflect the actuator over 360 degrees as a rotation angle, therefore, a large area of the substrate is visible when the actuator is inflected. This means that a high contrast display can be realized by a high aperture rate.

Further, in the invention, a shape memory effect of the organic material which constitutes the actuator, is utilized so that the pixel has a memory effect required for the low power consumption.

The shape memory effect of organic material is an effect, as follows. A force is applied to the organic material which is deformed with a heat (high temperature) applied thereto, and a temperature is lowered with the force applied to the organic material. Thereafter, the deformation is maintained even if the force is removed after the temperature lowered. Further, the shape of actuator is returned to an original shape when the temperature is raised without applying the force to the actuator with the deformation maintained. This phenomenon described above is referred to as a shape memory effect of the organic material.

By utilizing the shape memory effect of organic material, the organic actuator is used below as the pixel having the memory effect.

The pixel is constituted by arranging an electrode (lower electrode) whose surface is a white as an under-layer underneath the inflection-type organic actuator whose surface is a black. At this time, the actuator is used of a property indicating that the shape has an inflected state (curved surface) before a current flows into the actuator, and flowing the current into the actuator makes it to be deformed to straight (planar surface). That is, seeing the structure from top, a white of the under-layer is visible when the current is not flown thereinto, and a black of the actuator surface is visible because the under-layer is hidden when the current is flown into the actuator.

TABLE 1

| Condition | Electric Signal | | Color of Pixel |
| --- | --- | --- | --- |
| | Actuator | Lower Electrode | |
| A | OFF | OFF | Black |
| B | ON | OFF | White |
| C | ON | ON | White |
| D | OFF | ON | White |
| E | OFF | OFF | White |
| F | ON | OFF | White |
| G | OFF | OFF | Black |

An operation of the pixel in the actuator will be described with Table 1. In the beginning, in the case of a condition where an electric signal is not applied to the actuator and lower electrode, seeing the structure from top, the pixel is visible by a white because the actuator indicates an inflected and curved surface state (condition A). Next, the shape of actuator is deformed to the planar state from the curved surface state when an electric signal (current) is applied to the actuator alone. Seeing the structure from top, the pixel is visible by a black (condition B). Coulomb attraction acts on between the lower electrode and actuator when an electric signal (voltage) is applied to the actuator and lower electrode with the electric signal applied to the actuator (condition C). In the case of this condition, the actuator is attracted to the lower electrode by Coulomb force, and a force acts on the lower electrode so that the shape of actuator maintains the planar state under a high temperature. Next, the electric signal applying to the actuator is turned off while the electric signal is continuously applied between the actuator and lower electrode (condition D). In this occasion, the temperature of actuator falls while the shape of actuator maintains the planar state by the Coulomb force. Next, the voltage applying to the lower electrode is turned off after the temperature of actuator falls (condition E). The shape of actuator then maintains by the shape memory effect of organic material. That is, seeing the structure from top, a condition seen by a black can be maintained when the electric signal is not applied to the actuator and lower electrode. Further, the voltage is not applied to the lower electrode, and the current is flown into the actuator (condition F). Thereafter, the actuator is returned to an original curved surface state when the current flowing into the actuator is turned off (condition G), that is, returned to the condition A. In this way, two types of conditions, a black and white, can be maintained selectively in the condition without applying the electric signal. That is, the memory effect can be given to the pixel.

The foregoing pixel using the organic actuator is arranged with a matrix-like structure to thereby realize a display device.

Of course, the display device using the foregoing pixel can be used for not only a static drive, but also a dynamic drive in the case where each of the pixels adopts a structure with a diode and transistor incorporated into the pixel.

The self-heat generation type organic actuator used in the invention has a light weight and is made into a thin film easily. The actuator can be produced by a printing process because it operates in the atmosphere, and a process such as a hermetic seal for a solution etc. is not necessary. For this reason, a display device having a thin and light-weight can be manufactured easily.

According to the invention, it is possible to provide a simple display device in comparison with the conventional type. This display device has a thin and light-weight, flexibility, clear image, and low power consumption.

Other objects, features and advantages of the invention will become apparent from the following description of the embodiments of the invention taken in conjunction with the accompanying drawings.

BRIEF DESCRIPTION OF THE DRAWINGS

FIG. 9A1 to FIG. 9G are schematic plan views showing a manufacturing method of the display device in the second embodiment.

DETAILED DESCRIPTION OF THE EMBODIMENTS

Figure 1A:
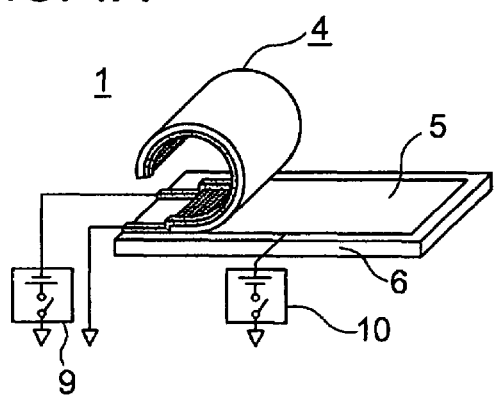
FIG. 1A to FIG. 1F are schematically perspective views showing a constitution and operation of a pixel portion in a display device of the first embodiment.

Embodiments of the invention will be described below with the reference to the drawings.

Embodiment 1

A pixel portion of a display device in the invention will be described in this embodiment.

FIGS. 1A to 1F are schematically perspective views showing a constitution and an operational method of the pixel portion in the display device. A pixel 1 is constituted by an inflection-type organic actuator 4 on which actuator electrodes 2, 3 are bonded to the surface thereof, and a substrate 6, a surface of which provides a lower electrode 5 thereon. That is, the inflection-type organic actuator 4 is constituted by a double-layered structure having an organic actuator film 7 and an insulating film 8, and a left end portion of the actuator 4 is fixed on the substrate 6. The organic actuator film 7 is a self-heat generation type organic actuator. The insulating film 8 has an insulating property and a high heat resistance, and is of a low thermal expansion coefficient material. In this embodiment, the self-heat generation type organic actuator uses of a composite film made up of carbon particles and polyester. The insulating film 8 uses of a polyimide film. The self-heat generation type organic actuator may use of metal particles such as silver particles instead of the carbon particles, and of acrylic resin, epoxy resin, fluorocarbon resin, etc. instead of the polyester. The insulating film 8 may also be used of a low thermal expansion coefficient resin such as aramid resin, etc. instead of the polyimide film. The lower electrode 5 is arranged under the actuator 4, and is turned to a shape hid by the actuator 4, when the actuator 4 is deformed to the planar-stated shape. Colors for the organic actuator film 7 and lower electrode 5 are set to a black and white, respectively. The actuator electrodes 2, 3 are connected to an actuator operation controller 9 and to a ground, restictively. The actuator operation controller 9 includes a power source and a switch. The lower electrode 5 is connected to an actuator shape maintaining controller 10 which includes a power source and a switch. The inflection-type organic actuator 4 uses of a unimorph type-inflection organic actuator which is inflected with a current not flown thereinto, and is planar with the current flown thereinto.

The pixel 1 is operated, as follows. Before an electric signal is applied to the pixel 1, that is, when both the switches in the actuator operation controller 9 and actuator shape maintaining controller 10 are an off-state, the actuator 4 is inflected as shown in FIG. 1A. For this reason, seeing the pixel 1 from top, a white of the lower electrode 5 is visible.

Figure 1B:
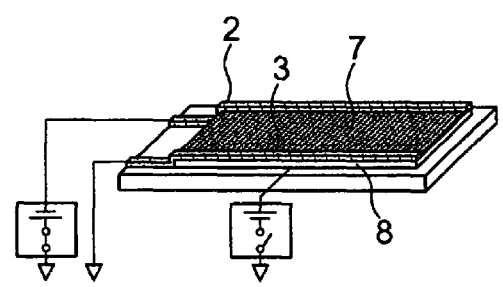

The actuator 4 is heated up by Joule heat to be deformed to the planar shape as shown in FIG. 1B, when the switch in the actuator operation controller 9 is turned on while the switch in the actuator shape maintaining controller 10 remains off. For this reason, seeing the pixel 1 from top, the lower electrode 5 is hidden, and a black of the organic actuator film 7 is visible.

Figure 1F:
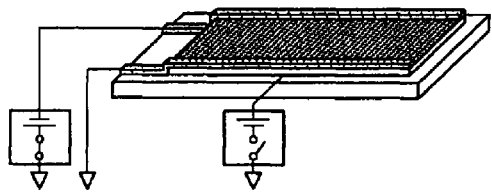
Figure 1C:
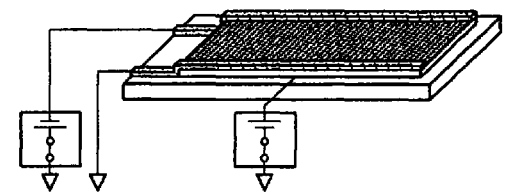
Figure 1E:
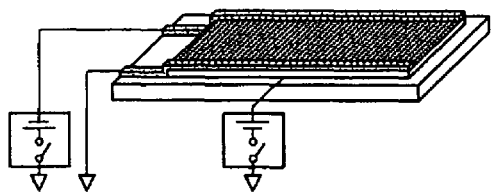

Next, the Coulomb force acts in a direction where the actuator 4 and lower electrode 5 are attracted by each other, when the switch in the actuator shape maintaining controller 10 is turned on (FIG. 1C).

Figure 1D:
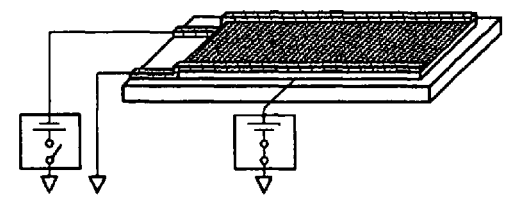

A temperature of the actuator 4 falls by a natural cooling, and the shape is intended to return to an original shape when the switch in the actuator operation controller 9 is turned off. At this time, the shape is fixed so that the actuator 4 is close to contact with the lower electrode 5 by the Coulomb force. Thus, the shape is not returned to the original inflected shape, but the planar state is maintained (FIG. 1D).

Further, the shape is not returned to the original inflected shape by the shape memory effect used for the organic material, and the planar-stated shape being in close contact with the lower electrode 5 is maintained (FIG. 1E) even if the Coulomb force is vanished away when the switch in the actuator shape maintaining controller 10 is turned off. That is, seeing the structure from top, the pixel 1 is visible by a black unlike FIG. 1A even if the electric signal is not applied to the pixel 1. In this way, the memory effect is realized.

Finally, the inflection-type organic actuator 4 is returned to the original shape by the shape memory effect of organic material as shown in FIG. 1A, when the switch in the actuator operation controller 9 is turned off after once the switch in the controller 9 is turned on as shown in FIG. 1F.

Figure 2:
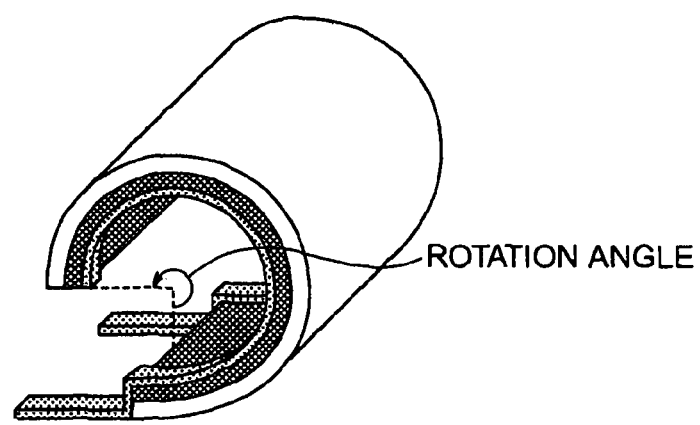
FIG. 2 is a schematically perspective view for explaining a rotation angle of an inflection-type organic actuator in the first embodiment.

Next, a description will be concerned with the inflected shape of the inflection-type organic actuator 4 of the pixel 1 and the color thereof. Here, a rotation angle is used for explaining a magnitude of the actuator inflection. FIG. 2 is a schematically perspective view for explaining a rotation angle of the inflection-type organic actuator 4 in the embodiment. The rotation angle is 270 degrees as an inflected shape shown in FIG. 2, 180 degrees in the case where the actuator is a semicircle, and 0 degree in the case of the planar state.

Figure 3:
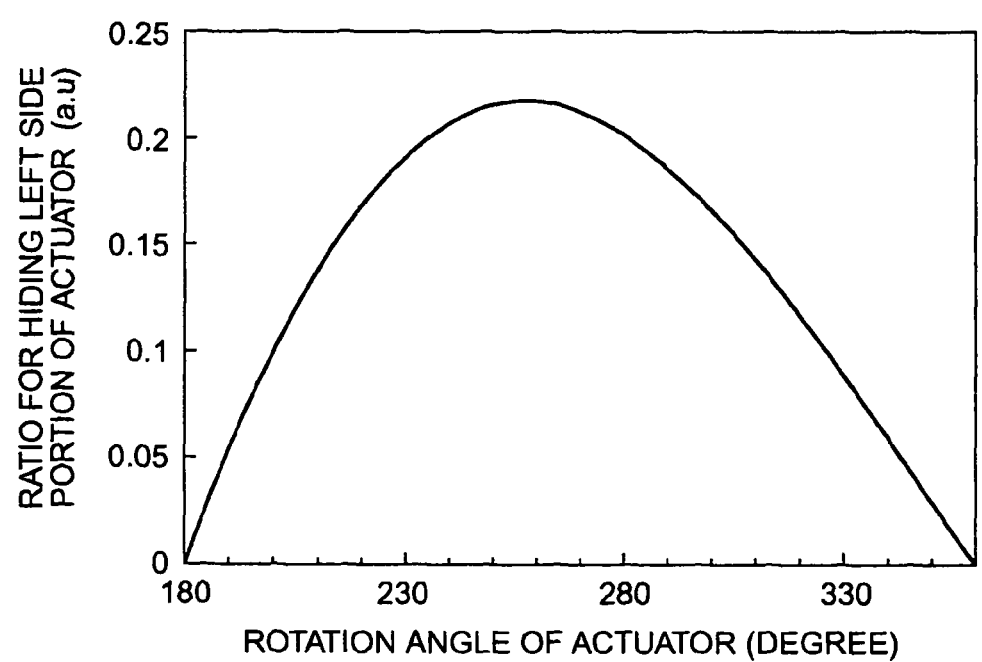
FIG. 3 is a graph showing a relationship between the rotation angle of inflection-type organic actuator 4 having 1 mm in length and a hidden amount of a left-side portion of the pixel 1 shown in FIG. 1A.
Figure 4:
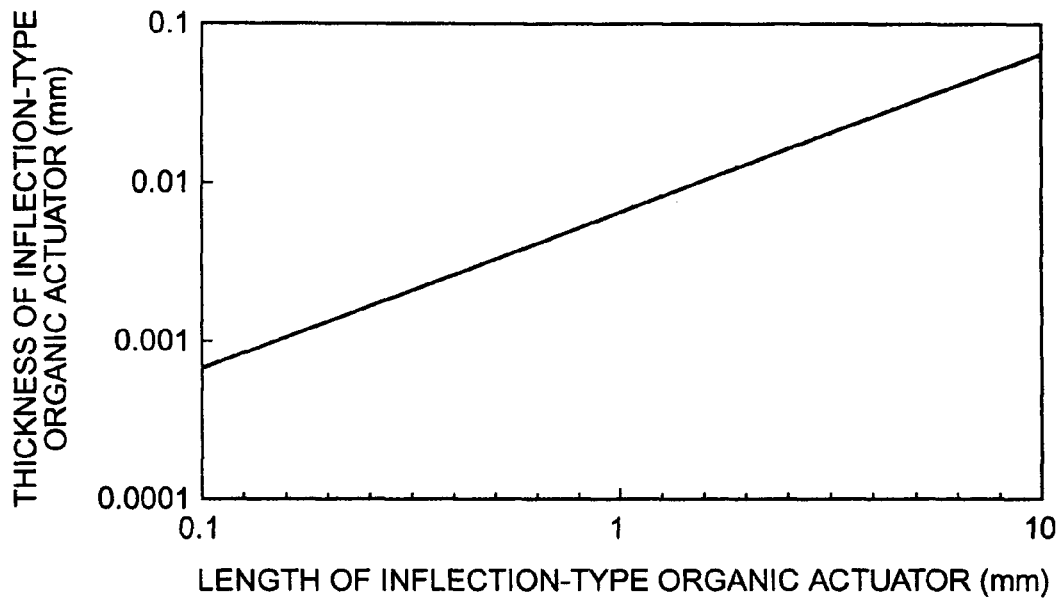
FIG. 4 is a graph showing a relationship between a length and thickness of the inflection-type organic actuator for obtaining a rotation angle of 260 degrees.

When a back surface of the actuator 4, or the insulating film 8 is turned into a white as the same as a color of the lower electrode 5, specifically, the actuator 4 is inflected so that the rotation angle of the actuator 4 is turned to 180 degrees, a black surface of the actuator 4 is invisible, but the entire pixel 1 is visible by a white. The left side portion of the pixel 1 can also be hid as shown in FIG. 1A in case of turning the rotation angle to over 180 degrees. Practically, each of the pixels is connected with one another in an image display device. A wiring portion can also be hid in this case if that portion is arranged on the left side of the pixel 1 as shown in FIG. 1A. FIG. 3 shows a relationship between the rotation angle of the actuator 4 having 1 mm in length and a hidden size where the left side portion of the pixel 1 shown in FIG. 1A. Referring to FIG. 3, it is appreciated that the largest left side portion is hidden when the rotation angle is about 260 degrees. FIG. 4 shows a relationship between a length and a film thickness of the actuator 4 for obtaining 260 degrees in rotation angle. In this case, both the organic actuator film 7 and insulating film 8 have the same Young's modulus and thickness, and FIG. 4 shows a result when the organic actuator film 7 is extended to 2%. According to FIG. 4, it is appreciated that the film thickness of the actuator 4 may be set to approximately 6.6 micrometers if the length of pixel 1 is set to 1 mm.

Figure 5:
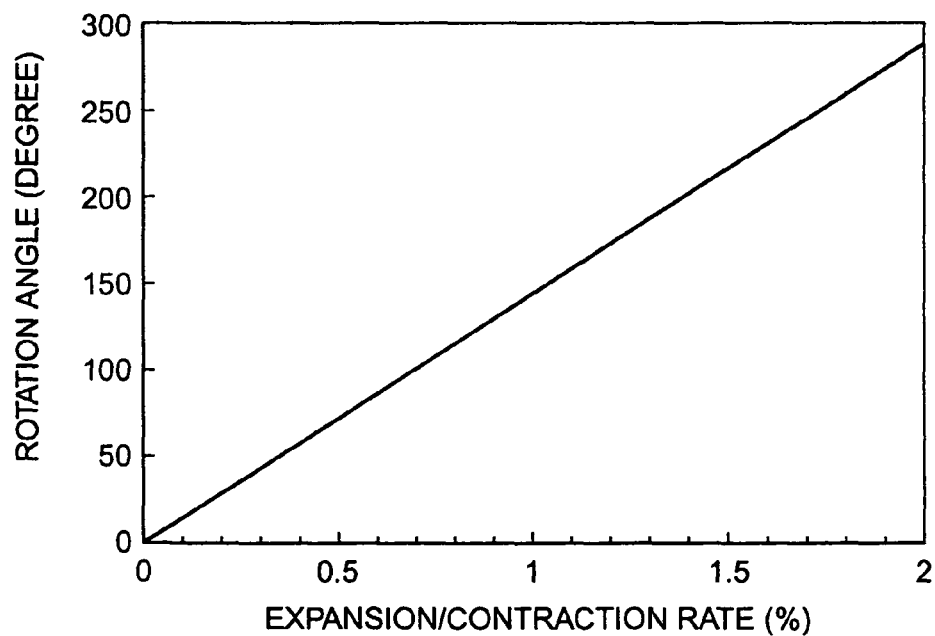
FIG. 5 is a graph showing a relationship between an expansion/contraction rate and the rotation angle of organic actuator film 7 in the case of using the inflection-type organic actuator 4 having 6 micrometers in thickness and 1 mm in length.

Further, the rotation angle of the actuator 4 is continuously changed from 0 degree to 260 degrees, so that the pixel 1 can display not only a binary state in a black and white but also a gray of gradation sequence. The rotation angle can also be controlled by changing an expansion/contraction rate in response to a current amount applied to the organic actuator film 7. FIG. 5 shows a relationship between the rotation angle and the expansion/contraction rate of the organic actuator film 7 in the case of using the inflection-type organic actuator 4 having 6 micrometers in film thickness and 1 mm in length. Thus, the rotation angle can be changed from 0 degree to approximately 260 degrees if the expansion/contraction rate of the organic actuator film 7 is changed from 0% to approximately 1.8%.

In this embodiment, the surface of inflection-type organic actuator 4 is set to a black, and that of lower electrode 5 is set to a white, but arbitrary colors can be used with any types of coatings, as required. Further, a color display is also available if a color filter is applied to a black and white pixel.

Next, a description will be concerned with a shape maintaining capability of the inflection-type organic actuator 4 caused by the Coulomb force.

In the case of using the actuator 4 having 1 mm×1 mm in size and constituted by the organic actuator film 7 and insulating film 8 both having 3 micrometers in film thickness, a necessary force is equal to or less than 0.04 gram-weights for maintaining the shape from the planar state where the actuator 4 is attached firmly to the lower electrode 5 to a state where the actuator 4 is not inflected. For this reason, the Coulomb force can be generated necessary for maintaining a sufficient shape if approximately 30 volts is applied to the lower electrode 5.

Figure 6A:
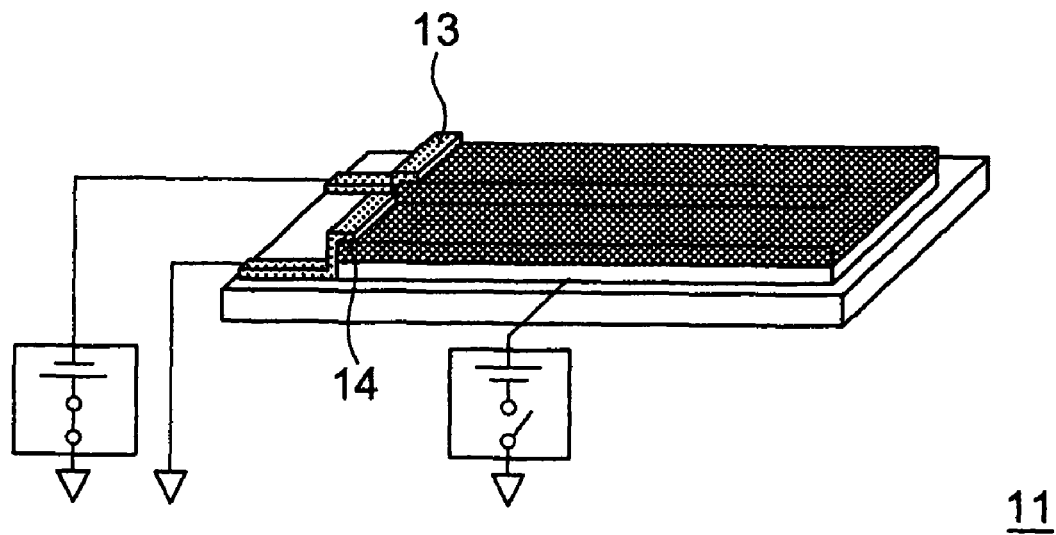
FIGS. 6A and 6B are schematically perspective views showing the inflection-type organic actuator of the pixel in the first embodiment.
Figure 6B:
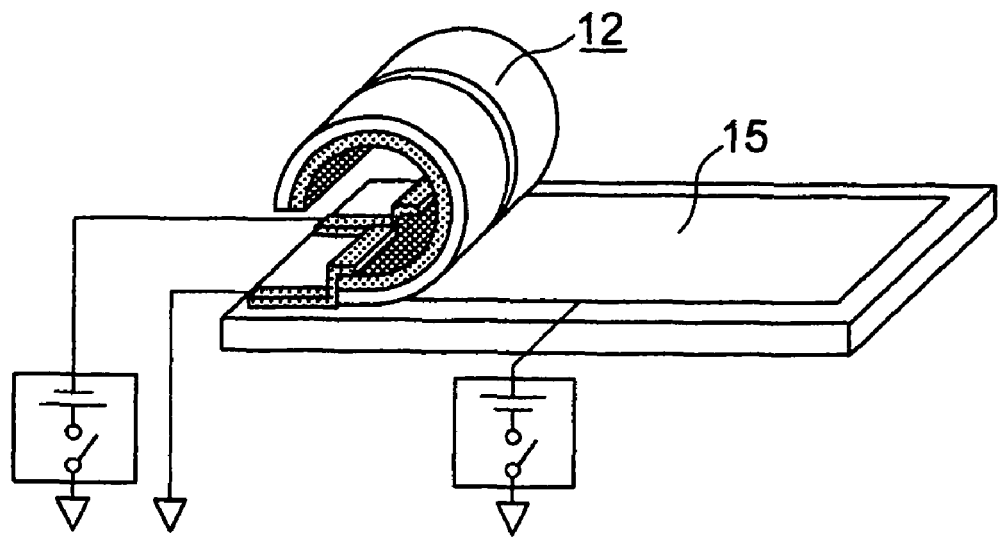

FIGS. 6A and 6B are schematically perspective views showing a pixel portion having another shape in the display device. FIG. 6A shows a planar state of the inflection-type organic actuator 4 in the pixel 11. FIG. 6B shows an inflected state of the actuator 4. The pixel 1 is constituted by an inflection-type organic actuator 12 similar to the pixel 1 in FIG. 1A, actuator electrodes 13, 14 bonded on a surface of the actuator 12, and a lower electrode 15, a color of which is a white, and arranged underneath the actuator 12. What the pixel 11 is different from the pixel 1 shown in FIG. 1A is that the shape of actuator 12 is of a channel-like shape, not a strip-like shape. For this reason, the actuator electrodes 13, 14 are not placed on the inflected surface, so that deterioration of the actuator electrodes 13, 14 caused by the inflected motion is much less than the structure in FIG. 1A.

Figure 7A:
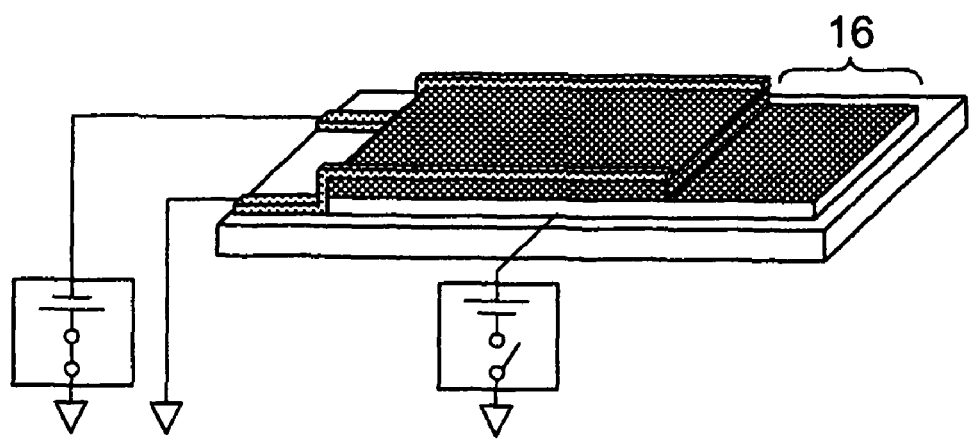
FIGS. 7A and 7B are schematically perspective views showing the inflection-type organic actuator of the pixel in the first embodiment.
Figure 7B:
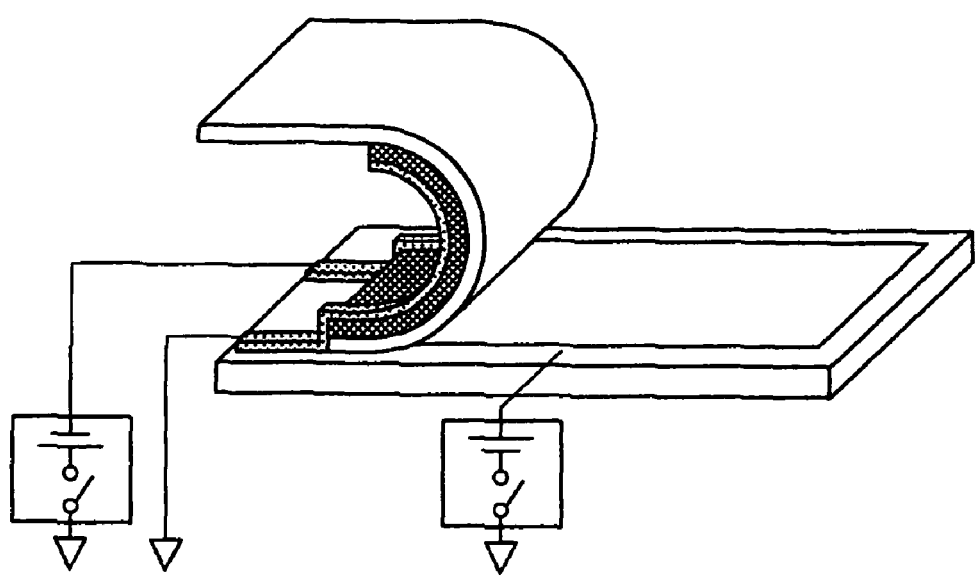

FIGS. 7A and 7B are schematically perspective views showing a pixel portion of another shape in the display device. FIG. 7A shows a planar state of the actuator 12 in the pixel 11. FIG. 7B shows an inflected state of the same. What the pixel 11 is different from the pixel 1 shown in FIG. 1A is that a non-expansion/contraction area 16 is provided on a peripheral portion of the actuator 12. The non-expansion/contraction area 16 has no organic actuator film 7, but has the insulating film 8 alone. However, the front surface of non-expansion/contraction area 16 has a black as the same as the organic actuator film 2. The pixel 11 shown in FIGS. 7A and 7B has a merit so that a wide area can be hid by a small rotation angle when the actuator 12 rotates.

Embodiment 2

In this embodiment, a description will be concerned with an example of a dot matrix-type display device having a structure arranging the pixel 1 (FIG. 1A) with the matrix-like structure in the invention.

Figure 8A:
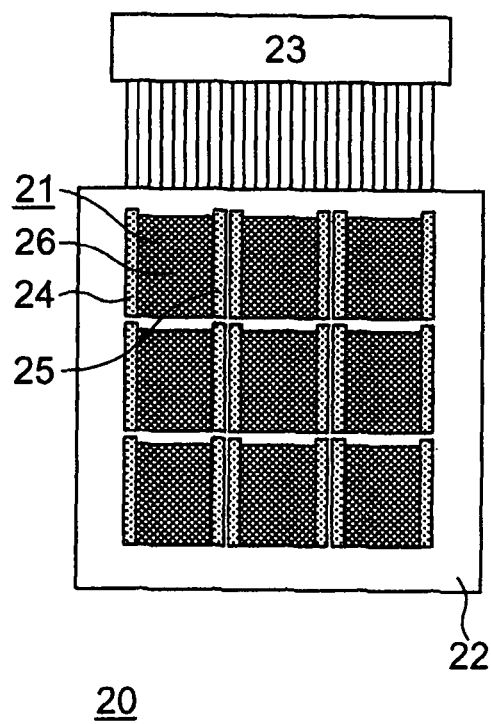
FIGS. 8A and 8B are schematic plan views showing a constitution of a display device seeing from a front surface in the second embodiment.
Figure 8B:
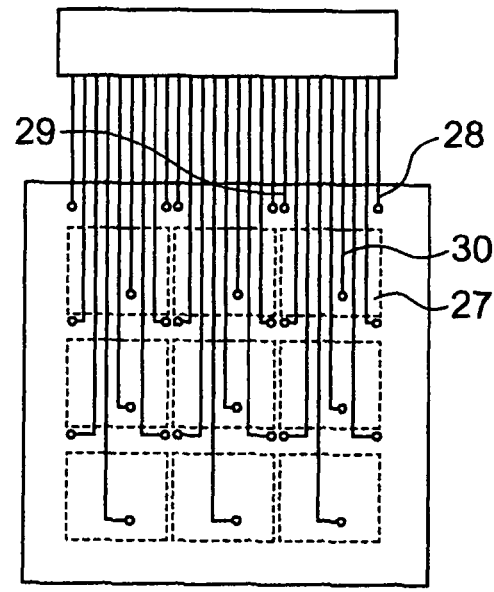

FIGS. 8A and 8B are schematic plan views showing a constitution of the display device in the invention. FIG. 8A is a schematic plan view seeing from a front. FIG. 8B is a schematic plan view seeing from a back. A display device 20 is constituted by pixels 21, a substrate 22 and a controller 23. The structure of pixels 21 is the same as that of the pixel 1 shown in FIG. 1A, that is, constituted by a lower electrode 27 and an inflection-type organic actuator 26 bonded with actuator electrodes 24, 25. The lower electrode 27 is arranged on a front surface of the substrate 22, but is not shown in FIG. 8A because it is hid underneath the actuator 26. The lower electrode 27 is therefore indicated by dotted lines as seen from the back in FIG. 8B. The back surface of the substrate 22 provides with the actuator electrodes 24, 25, actuator operation control wirings 28, 29, and an actuator shape maintaining control wiring 30. The controller 23 is used for operating the actuator 26 in the pixel 21 and maintaining the shape of the actuator 26. The controller 23 corresponds to the actuator operation controller 9 and actuator shape maintaining controller 10 shown in FIG. 1A of the first embodiment, and also includes a portion for controlling the respective pixels to turn on and off on the basis of image data to be displayed.

FIG. 8A shows that the number of pixels is 9, that is, 3 in line and 3 in column, which is an explanatory structure. Arbitrary number of pixels may be arranged with the matrix-like structure.

An image display can be realized in such a way that image data is supplied to the controller 23 on the basis of image information to be displayed, colors for the respective pixels 21 are determined by the controller 23, and current signals from the respective actuator operation control wirings 28, 29 are supplied to the respective pixels 21 to be set to the respective colors, as realized with such as a liquid-crystal display and a liquid-emitting diode dot matrix display driven by a static drive. In the case of displaying a binary image, an electric signal is applied to the actuator operation control wirings 28, 29 and actuator shape maintaining control wiring 30 by the manner as described with reference to FIG. 1 in the first embodiment, so that the memory effect can be used. For this reason, after an image is displayed once, the image can be kept displaying until the image data is changed, without consuming the power.

Next, a description will be concerned with a manufacturing method of a dot matrix-type display device with use of FIGS. 9A to 9G in the embodiment.

FIG. 9A1 to FIG. 9G are schematic plan views showing a manufacturing method of the display device in the invention. First, by using an ordinary manufacturing method of a double-sided flexible printed circuit board, the quadrilateral lower electrode 27 is formed on one surface (front surface) of the substrate 22, and the actuator operation control wirings 28, 29 and actuator shape maintaining wiring 30 are formed on the other surface (back surface) (FIG. 9A1) and (FIG. 9A2). Specifically, FIG. 9A1 shows a front surface, and FIG. 9A2 shows a back surface. Here, a polyimide film is used for the substrate 22, as well as the ordinary double-sided flexible printed circuit board, and copper is used for the lower electrode 27, actuator operation control wirings 28, 29, and actuator shape maintaining wiring 30. The ends of actuator operation control wirings 28, 29 and actuator shape maintaining wiring 30 on the back surface are electrically connected to the components on the front surface by through-holes 31, 32, 33. The lower electrode 27 is bonded with the actuator shape maintaining wiring 30 via the through-hole 33. The through-holes 31, 32 for the actuator operation control wirings 28, 29 are located close to the lower electrode 27.

Subsequently, the surface of substrate 22 is coated by a white with use of a printing manner (FIG. 9B). On this occasion, portions exposed on the surface of through-holes 31, 32 are not coated to keep conductivity for the through-holes.

Next, a sacrifice layer pattern 34 composed of soluble polyvinyl alcohol is printed on the surface of substrate 22 so that the lower electrode 27 is hid entirely (FIG. 9C). At this time, in edges around the through-holes 31, 32, the printing is carried out so that the edges of lower electrode 27 are matched with those of the sacrifice layer pattern 34.

An insulating layer 35 is printed on the sacrifice layer pattern 34 of the surface of substrate 22 by using a polyimide ink mixed with a colorant to be turned to a white (FIG. 9D). The insulating layer 35 is partly contacted on the white-coated substrate 22 around the through-holes 31, 32, however, other portions are printed on a position where the lower electrode 27 is just hid underneath the sacrifice layer pattern 34.

The printing is carried out with use of an actuator ink so that an actuator film 36 is overlapped accurately with the insulating layer 35 (FIG. 9E). The actuator ink is an ink made by dissolving the self-heat generation type organic actuator material, which utilizes a thermal expansion, into an organic solvent. Specifically, an ink made by dissolving carbon particles and polyester into a toluene-based thinner is used in this embodiment.

The actuator electrodes 24, 25 are then printed on the actuator film 36 by using a conductive ink (FIG. 9F). The actuator electrodes 24, 25 are printed not only on the actuator film 36, but also on the through-holes 31, 32 so that they are contacted with these electrodes.

Finally, an entire product made by the foregoing process is immersed in a water to dissolve the sacrifice layer pattern 34, after that, the inflection-type organic actuator 26 is peeled off from the substrate 22, except for a portion to which the substrate 22 is contacted. At this time, as the solvent in the actuator ink evaporates, the inflection-type organic actuator 26 constituted by the insulating layer 25 and actuator film 36 is inflected by generating an internal stress in the actuator film 36 (FIG. 9G).

In this embodiment, the inflection-type organic actuator 26 is formed on the sacrifice layer pattern 34, and the inflection movable portion of the actuator 26 is then formed by dissolving the sacrifice layer pattern 34. However, the substrate 22 and actuator 26 may be formed separately, thereafter, may be bonded together.

Further, the reflection-type display device has been described in this embodiment. However, a transmission-type display device may also be produced by transmitting a light from the back of device if a transmissive material such as polycarbonate, polyethylene, etc. is used instead of polyimide for the substrate 22, and a transmissive electrode material such as ITO etc. is also used instead of copper for the lower electrode 27.

Embodiment 3

In this embodiment, a description will be concerned with an example of a dot matrix-type display device having a matrix-arranged structure of the pixels 11, as described in FIGS. 6A and 6B.

Figure 10A:
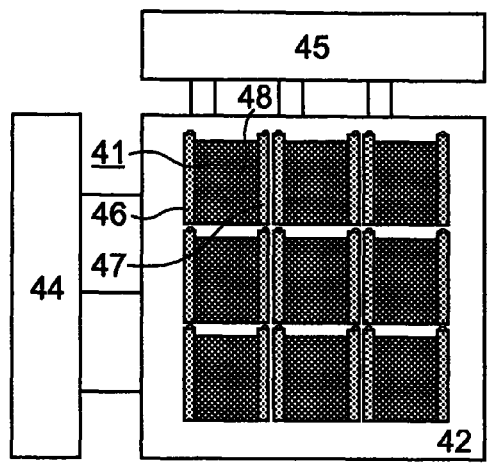
FIGS. 10A to 10C are schematic plan views showing a constitution of display device in the third embodiment.
Figure 10B:
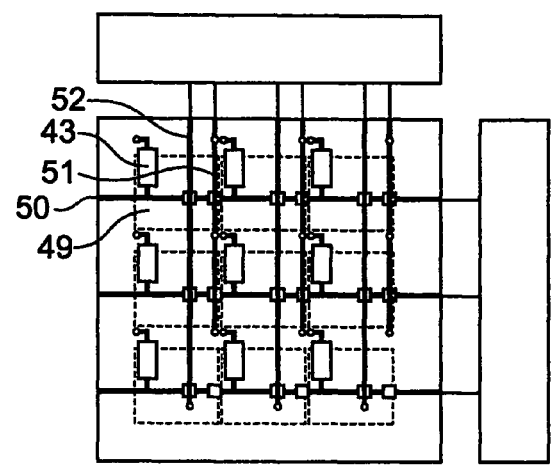
Figure 10C:
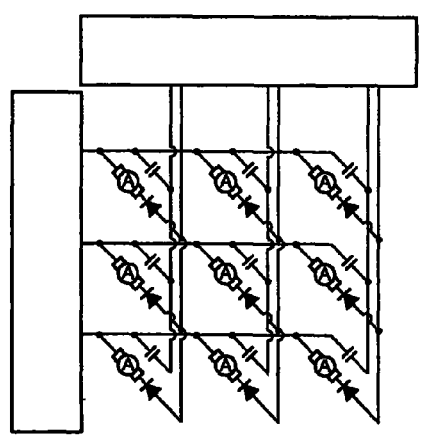

FIGS. 10A, 10B and 10C are schematic plan views showing an example of a display device in the invention. FIG. 10A is a schematic plan view seeing from a front surface. FIG. 10B is a schematic plan view seeing from a back surface. FIG. 10C shows an equivalent circuit of the display device to explain the invention. In FIG. 10C, the lower electrode 27 and actuator film 36 constitute substantially a capacitor, therefore, both components are indicated by a capacitor.

A display device is constituted by pixels 41, a substrate 42, diodes 43, a scanning controller 44, and a data controller 45. Similarly to the second embodiment, each of the pixels 41 is constituted by a lower electrode 49 and an inflection-type organic actuator 48 bonded with actuator electrodes 46, 47. The lower electrode 49 is arranged on the front surface of substrate 42, but not shown in FIG. 10A because of hiding underneath the inflection-type organic actuator 48. In the case of FIG. 10B seeing from the back surface, the lower electrode 49 is not seen, but indicated by dotted lines. The back surface of substrate 42 provides with a scanning wiring 50, an actuator data wiring 51, and an actuator shape maintaining wiring 52. The actuator electrodes 46 for all of the pixels 41 are connected to the actuator data wirings 51, respectively. The actuator electrodes 47 for all of the pixels 41 are connected to the one ends of diodes 43, respectively. The other ends of diodes 43 are connected to the scanning wirings 50, respectively. The lower electrodes 49 for all of the pixels 41 are connected to the actuator shape maintaining wirings 52, respectively. The scanning wirings 50 are connected to the scanning controller 44. The actuator data wirings 51 and actuator shape maintaining wirings 52 are connected to the data controller 45. An insulating film is provided on intersections at the wirings 50 and 51, and wirings 50 and 52, for avoiding an electric contact one another.

FIG. 10A shows that the number of pixels is 9, that is, 3 in line and 3 in column, which is an explanatory structure. Arbitrary number of pixels may be arranged on the matrix-like structure.

In the case of displaying an image, a signal is applied to the pixel while a timing of the scanning controller 44 is matched with that of the data controller 45, such as a liquid-crystal display device and LED dot matrix display device operated by the dynamic drive. That is, the scanning wiring 50 of a first column is turned to an active by the scanning controller 44, at the same time, the actuator data wiring 51 of a pixel, the color of which is inverted, is set by the data controller 45 in response to image information to be displayed so that a current is applied to the wiring 51. The current flown through the wiring 51 is limited by the diode 43 connected in series with the pixel 41, so that the color of pixel set by the scanning wiring 50 of the first column alone is inverted. Similarly, a next line is set to an active, and data is set to the line continuously to be able to display an image. In the case of displaying a binary image, an electric signal is applied to the actuator data wiring 51 and actuator shape maintaining wiring 52, so that the image can be kept displaying without consuming a power until the image data is changed after once displaying the image, because the memory effect is active.

In the case of the display device in the invention, unlike the display device constituted by the liquid-crystal and light-emitting diode, a DC current flows into the pixel regardless of its polarity because the pixel is electrically equivalent to a resistance. For this reason, the current flows as little as possible into pixels other than the pixels indicated by the actuator data wiring 51 to thereby occur a cross talk if the diode is not connected in series with the pixel. In this embodiment, the diode is connected in series with the pixel, however, a transistor can also be connected, such as the liquid-crystal display device driven by an active control.

A dot matrix-type display device in the embodiment can be produced by the same manufacturing method of the display device 20, as already described with FIG. 9A1 to FIG. 9G in the second embodiment. A big different between the display devices 40 and 20 in the manufacturing is that the diode 43 is incorporated in the substrate 42 of display device 40. The diode 43 can be formed by stacking a metal, an insulator, and a metal, in the order of process, on a necessary location of the substrate 42 by a vacuum deposition similar to manufacturing an MIM liquid-crystal display device and TFD liquid-crystal display device. Further, the diode can be replaced with an organic diode. A chip-diode device can also be used as externally mounted on the pixel if the pixel is relatively large.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display device comprising: a substrate having a surface of a planar state; a first electrode provided on the surface of the substrate and having a surface of a planar states; a first controller having a first power source to apply a voltage to the first electrode; and a self-heat generation type organic actuator, an end side of which is fixed on the substrate, and provided on the first electrode, wherein
   the actuator includes a plate-like conductive organic material member on which a pair of second electrodes is provided to supply an electric power to the organic material member, and a second controller having a second power source to supply a voltage to the pair of second electrodes, and wherein
   (a) the actuator is assumed that a fixed portion at the end side of the actuator and other portion thereof are inflected about the end side, in an initial state,
   (b) a voltage is applied to the pair of second electrodes and a voltage applied to the first electrode is turned to a non-applied state so that the actuator is deformed from an inflected state to a planar state,
   (c) the voltage applied to the pair of second electrodes is turned to the non-applied state and the first electrode is turned to a voltage applied-state so that the actuator maintains the planar state,
   (d) the voltage applied to the pair of second electrodes is turned to the non-applied state and the first electrode is turned to a voltage applied-state so that the actuator maintains the planar state,
   (e) the voltage applied to the pair of second electrodes is then turned to the non-applied state and the first electrode is turned to the voltage non-applied state so that the actuator maintains continuously the planar state,
   (f) the voltage applied to the pair of second electrodes is turned to the applied-state and the first electrode is turned to the voltage non-applied state so that the actuator maintains continuously the planar state,
   (g) the voltage applied to the pair of second electrodes is turned to the non-applied state and the first electrode is turned to the voltage non-applied state so that the actuator is deformed from the planar state to the inflected state, and
   operations (b) to (g) are repeated so that the actuator can indicate two states of the planar state and inflected state.

2. The display device according to claim 1, wherein assuming that a color of a first surface seeing from an external side is set to a first color and a color of a second surface which is opposite side of the first surface is set to a second color in a condition where the organic material member is turned to the planar state, the first color is different from the second color; a color of a portion of the first surface of the first electrode is substantially identical with the second color.

3. The display device according to claim 1, wherein the first electrode and the pair of second electrodes with the actuator on the substrate are provided with a matrix-like structure, and the voltage applied or non-applied to the first and second electrodes each connected with the individual actuator is controlled individually so that a deformation motion of the individual actuator is controlled individually to thereby carry out a dot matrix-like display.

4. The display device according to claim 1, wherein a planar shape of the actuator is a rectangle, a square, and/or a strip-like shape, and wherein
   the end side of the actuator is fixed on the substrate and the other portions are free.

5. The display device according to claim 4, wherein the pair of second electrodes is provided along in an inflecting direction of the actuator and in parallel with each other, and the actuator is provided on the organic material member.

6. The display device according to claim 1, wherein a planar shape of the actuator is a rectangle, a square, and/or a channel-like shape, and
   both end portions of the channel-like shape are fixed on the substrate, and the other portions are free.

7. The display device according to claim 6, wherein one sides of the pair of second electrodes are provided on one of the both end portions, and other sides of the pair of second electrodes are provided on other of the both end portions.

8. The display device according to claim 1, wherein a second member is fixed on a surface side where a side is extended when the organic material member is inflected, a length in a longitudinal direction of the second member is longer than a length in a longitudinal direction of the organic material member, and end sides of the organic material member and the second member are fixed on the substrate.

9. The display device according to claim 1, wherein a current amount applied to the actuator is changed so that an expansion/contraction amount of the actuator is changed, a rotation angle is controlled by inflecting the actuator, and a gradation sequence of the individual actuator is controlled as a pixel.

10. The display device according to claim 2, wherein the first color and second color are set to a pair of a white and black or a black and white, respectively.

11. The display device according to claim 1, wherein a pixel is defined by utilizing at least an exposed or non-exposed portion of an expansion/contraction motion and an under-layer of the actuator,
   three wirings consisting of a wiring for the first electrode, a wiring for the second electrode, and a common ground wiring, are connected with the plural pixels, respectively,
   at least one of the first and second controllers has a scanning portion to scan a signal in response to data to be displayed and a data portion to control a shape of the actuator,
   wirings for applying signals to the plural actuators in the pixel are connected in series with the data portion, wirings for applying signals to the plural first electrodes in the pixel are connected in series with the data portion, and plural ground wirings in the pixel are connected in series with the scanning portion.

12. The display device according to claim 11, wherein a diode is connected in series with the pixel.

* * * * *